US010246274B2

(12) United States Patent
Bent et al.

(10) Patent No.: US 10,246,274 B2
(45) Date of Patent: Apr. 2, 2019

(54) SYSTEMS AND METHODS FOR AIR CART PRESSURIZATION MONITORING

(71) Applicant: CNH Industrial Canada, Ltd., Saskatoon (CA)

(72) Inventors: Ethan Curtis Stephen Bent, Saskatoon (CA); Benjamin Douglas McKnight, Aberdeen (CA); Dennis George Thompson, Saskatoon (CA); Gregory Jacob Erker, Saskatoon (CA); Anthony Charles Rapley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 154 days.

(21) Appl. No.: 14/932,501

(22) Filed: Nov. 4, 2015

(65) Prior Publication Data
US 2017/0121130 A1    May 4, 2017

(51) Int. Cl.
*B65G 53/66*        (2006.01)
*B65G 53/04*        (2006.01)
(Continued)

(52) U.S. Cl.
CPC .............. *B65G 53/04* (2013.01); *A01C 7/081* (2013.01); *A01C 7/20* (2013.01); *B65G 53/06* (2013.01);
(Continued)

(58) Field of Classification Search
CPC .......... B65G 53/12; B65G 53/66; A01C 7/205
(Continued)

(56) References Cited

U.S. PATENT DOCUMENTS 2,272,564 A * 2/1942 Kuever, Jr. ............ B65G 53/00
                                                    241/39
3,863,428 A * 2/1975 Baxter ................. A01D 46/085
                                                    116/70

(Continued)

FOREIGN PATENT DOCUMENTS

CA          1149681 A       7/1983
WO       2014018717 A1      1/2014

OTHER PUBLICATIONS

U.S. Appl. No. 62/075,149, filed Nov. 4, 2014, Joel John Octave Gervais.

*Primary Examiner* — Joseph A Dillon, Jr.
(74) *Attorney, Agent, or Firm* — Rebecca L. Henkel; Rickard K. DeMille

(57) ABSTRACT

In one embodiment, a pneumatic distribution system configured to distribute a granular product to an agricultural implement includes a first pressure sensor, a second pressure sensor, and a controller. The first pressure sensor is configured to be fluidly coupled to a storage tank configured to store the granular product and positioned upstream of the meter roller. The first pressure sensor is configured to output a first signal indicative of a first static pressure in the storage tank. The second pressure sensor is configured to be fluidly coupled to a component of the pneumatic distribution system, downstream of the meter roller. The second pressure sensor is configured to output a second signal indicative of a second static pressure downstream of the meter roller. The controller is communicatively coupled to the first pressure sensor and to the second pressure sensor. The controller is configured to determine a pressure differential, wherein the pressure differential is the difference between the first static pressure and the second static pressure. The controller may also be configured to generate a first warning when the first static pressure is below a threshold value and output the first (Continued)

warning to an operator interface, generate a second warning when the pressure differential is below a desired range and output the second warning to the operator interface, and generate a third warning when the pressure differential is above the desired range and output the third warning to the operator interface.

11 Claims, 13 Drawing Sheets

(51) Int. Cl.
    *A01C 7/20*     (2006.01)
    *A01C 7/08*     (2006.01)
    *B65G 53/06*     (2006.01)
    *B65G 53/46*     (2006.01)
    *A01C 5/06*     (2006.01)

(52) U.S. Cl.
    CPC ......... *B65G 53/4633* (2013.01); *B65G 53/66* (2013.01); *A01C 5/062* (2013.01); *A01C 5/066* (2013.01); *A01C 7/08* (2013.01); *B65G 2201/042* (2013.01); *B65G 2203/02* (2013.01)

(58) Field of Classification Search
USPC ............... 406/11, 14, 34–35, 127, 144, 146; 137/14
See application file for complete search history.

(56) References Cited

U.S. PATENT DOCUMENTS

| | | | |
|---|---|---|---|
| 4,280,419 A | 7/1981 | Fischer | |
| 4,592,679 A * | 6/1986 | Boiting | B65G 53/22 406/127 |
| 4,697,962 A | 10/1987 | Dunbar et al. | |
| 5,350,257 A | 9/1994 | Newbolt et al. | |
| 5,672,050 A * | 9/1997 | Webber | F04B 49/022 417/18 |
| 5,911,362 A | 6/1999 | Wood et al. | |
| 5,924,371 A | 7/1999 | Flamme et al. | |
| 5,996,516 A | 12/1999 | Benneweis et al. | |
| 6,003,455 A | 12/1999 | Flamme et al. | |
| 6,024,035 A | 2/2000 | Flamme | |
| 6,250,521 B1 * | 6/2001 | Assar | B22D 41/42 222/590 |
| 6,283,679 B1 | 9/2001 | Gregor et al. | |
| 6,447,215 B1 * | 9/2002 | Wellmar | B65G 53/66 406/11 |
| 6,491,479 B1 | 12/2002 | Rexius | |
| 6,546,811 B2 * | 4/2003 | Fincke | G01F 1/44 73/861.63 |
| 6,708,080 B2 | 3/2004 | Benneweis | |
| 7,101,120 B2 | 9/2006 | Jurkovich | |
| 7,630,861 B2 * | 12/2009 | Longsdorf | G08C 19/02 370/410 |
| 8,504,310 B2 * | 8/2013 | Landphair | A01C 7/081 702/45 |
| 8,522,700 B2 | 9/2013 | Landphair | |
| 8,656,848 B2 | 2/2014 | Hubalek et al. | |
| 8,746,158 B2 | 6/2014 | Binsirawanich et al. | |
| 8,928,486 B2 * | 1/2015 | Hui | A01C 7/081 340/608 |
| 9,615,506 B2 * | 4/2017 | Ruppert | A01C 7/102 |
| 2007/0010968 A1 * | 1/2007 | Longsdorf | G08C 19/02 702/183 |
| 2008/0145156 A1 * | 6/2008 | Livingood | B65G 53/48 406/14 |
| 2011/0035163 A1 * | 2/2011 | Landphair | A01C 7/081 702/45 |
| 2011/0299943 A1 | 12/2011 | Woolever | |
| 2012/0036914 A1 * | 2/2012 | Landphair | A01C 7/081 73/1.16 |
| 2012/0227647 A1 | 9/2012 | Gelinske et al. | |
| 2012/0228395 A1 | 9/2012 | Needham et al. | |
| 2013/0061789 A1 * | 3/2013 | Binsirawanich | G01F 1/74 111/107 |
| 2013/0340444 A1 * | 12/2013 | Bryant | B60H 1/00964 62/62 |
| 2014/0049395 A1 * | 2/2014 | Hui | A01C 7/081 340/608 |
| 2014/0067209 A1 | 3/2014 | Casper et al. | |
| 2014/0163490 A1 * | 6/2014 | Locke | A61M 1/0031 604/319 |
| 2014/0263409 A1 * | 9/2014 | Wagers | B65G 53/40 222/1 |
| 2016/0120103 A1 * | 5/2016 | Gervais | B65G 53/66 406/10 |
| 2016/0128270 A1 * | 5/2016 | Ruppert | A01M 9/0053 239/68 |

\* cited by examiner

SYSTEMS AND METHODS FOR AIR CART PRESSURIZATION MONITORING

BACKGROUND

The invention relates generally to an agricultural product distribution system, and more particularly, to monitoring the pneumatic distribution of a granular product.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement via an agricultural product distribution system (e.g., an air cart). Unfortunately, pressure variations within the system may affect distribution of the granular product, which may in turn reduce farming efficiency.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a pneumatic distribution system configured to distribute a granular product to an agricultural implement includes a first pressure sensor, a second pressure sensor, and a controller. The first pressure sensor is configured to be fluidly coupled to a storage tank configured to store the granular product and positioned upstream of the meter roller. The first pressure sensor is configured to output a first signal indicative of a first static pressure in the storage tank. The second pressure sensor is configured to be fluidly coupled to a component of the pneumatic distribution system, downstream of the meter roller. The second pressure sensor is configured to output a second signal indicative of a second static pressure downstream of the meter roller. The controller is communicatively coupled to the first pressure sensor and to the second pressure sensor. The controller is configured to determine a pressure differential, wherein the pressure differential is the difference between the first static pressure and the second static pressure. The controller may also be configured to generate a first warning when the first static pressure is below a threshold value and output the first warning to an operator interface, generate a second warning when the pressure differential is below a desired range and output the second warning to the operator interface, and generate a third warning when the pressure differential is above the desired range and output the third warning to the operator interface.

In another embodiment, a pneumatic distribution system configured to distribute a granular product to an agricultural implement includes a differential pressure sensor and a controller. The differential pressure sensor is configured to be fluidly coupled to a storage tank configured to store the granular product and to a component of the pneumatic distribution system downstream of a meter roller. The differential pressure sensor is configured to output a signal indicative of a pressure differential across the meter roller. The controller is communicatively coupled to the differential pressure sensor and is configured to generate a first warning when the pressure differential is below a desired range and output the first warning to an operator interface, and generate a second warning when the pressure differential is above the desired range and output the second warning to the operator interface.

In a further embodiment, a method of monitoring a pneumatic distribution system configured to distribute a granular product to an agricultural implement includes receiving, at a processor, one or more signals from one or more pressure sensors, indicative of a pressure differential across a meter roller, generating, using the processor, an insufficient pressure differential warning when the pressure differential is below a desired range and outputting the insufficient pressure differential warning to an operator interface, and generating, using the processor, an excessive pressure differential warning when the pressure differential is above a desired range and outputting the excessive pressure differential warning to the operator interface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
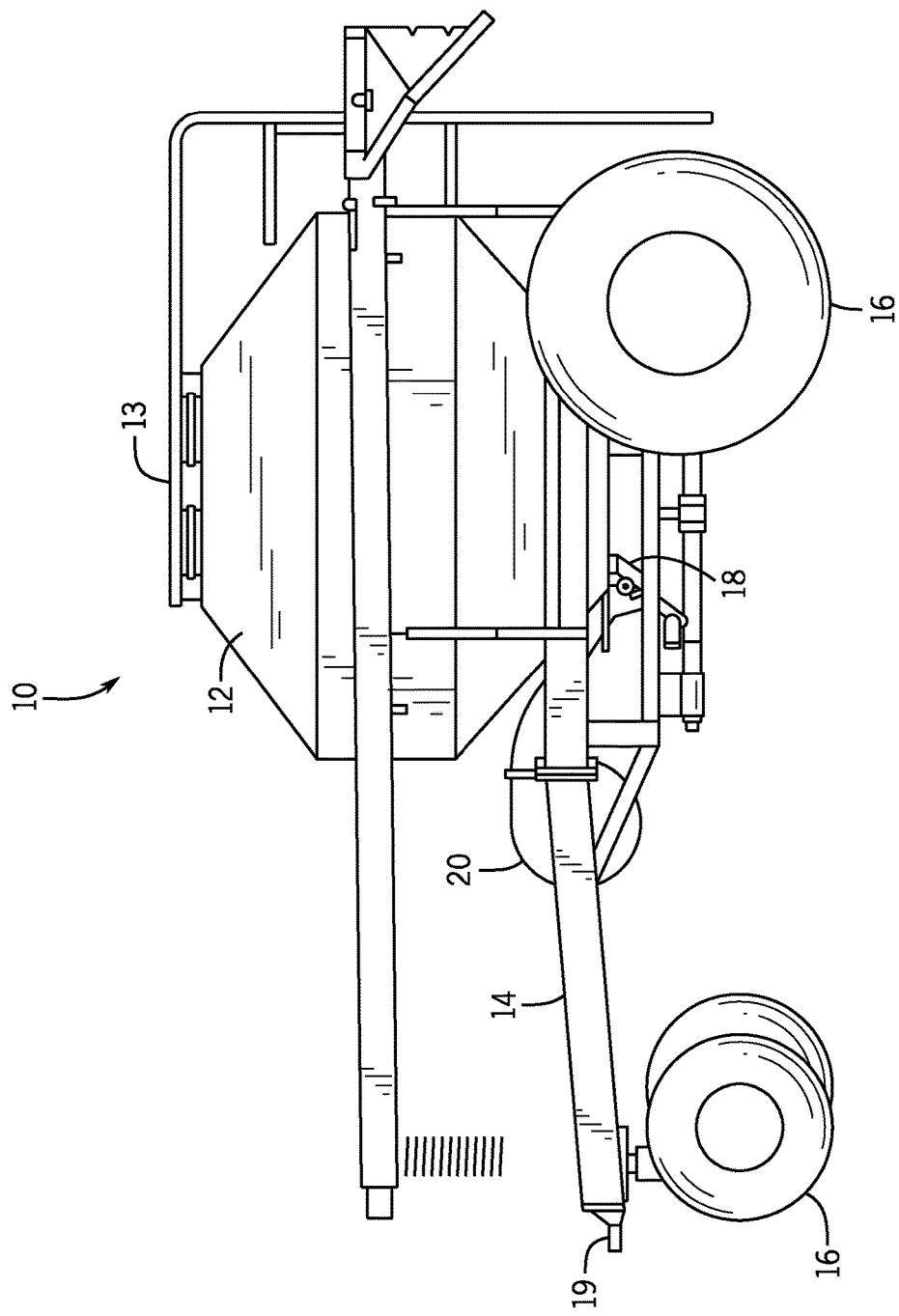
FIG. 1 is a side view of an air cart, including an agricultural product distribution system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Generally an agricultural product distribution system may include a towable agricultural implement to deposit a granular product into the soil. As used herein, the granular product may be any suitable particulate material that is desired to be deposited into the ground, such as various types of seeds and fertilizers. However, to simplify the following discussion, the product will be described as seeds. Nevertheless, one of ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, one or more metering assemblies on the air cart may pneumatically distribute the granular product to the row units. For example, the metering assemblies may control output of the granular product from a storage tank into an air stream, which is then delivered to the row units via pneumatic lines (e.g., including one or more primary lines coupled to the air cart) that fluidly connect the metering assembly to the row units.

Over its length, the cross-sectional area of the primary lines may change (e.g., due to shrinking). As such, pressure variations in the primary lines may be induced by the Venturi effect. Certain differences between the static pressure upstream of the metering assembly (e.g., in the storage tank) and the static pressure downstream of the metering assembly, as a result of the Venturi effect or other factors, may have an undesirable effect on the flow rate of the granular product out of the storage tank and into the primary line. For example, when the pressure differential across the metering assembly (ΔP) is greater than the desired value range, the granular product may flow out of the tank at a higher rate than desired. Alternatively, when ΔP is lower than the desired value range, the granular product may flow out of the storage tank at a lower rate than desired.

Accordingly, as will be described in more detail below, embodiments described herein may improve the product flow consistency of the product distribution system by generating an alert for an operator when ΔP is outside of a desired range. For example, one embodiment includes a pneumatic distribution system configured to distribute a granular product to an agricultural implement and having at least two pressure sensors and a controller. A first pressure sensor is positioned upstream of a metering assembly and a second pressure sensor is positioned downstream of the metering assembly to facilitate monitoring of ΔP. For example, a first pressure sensor is fluidly coupled to a granular product storage tank and outputs a first signal indicative of a first static pressure in the storage tank. A second pressure sensor may be fluidly coupled to a meter housing. The second pressure sensor outputs a second signal indicative of a second static pressure in the meter housing (e.g., the static pressure at an edge of a meter roller). In addition, or as an alternative to the second pressure sensor, one or more pressure sensors (e.g., third and/or fourth pressure sensors) may be fluidly coupled to each of the primary lines that pneumatically deliver the granular product to the agricultural implement. Each of the primary lines may deliver the granular product to the agricultural implement by guiding an air stream from a first section of the primary line with a larger cross-sectional area to a second section of the primary line with a smaller cross-sectional area, and then to a larger cross-sectional area section that provides the product to the row units. In some embodiment, the third pressure sensor outputs a third signal indicative of a third static pressure in the second section of the first primary line, and the fourth pressure sensor outputs a fourth signal indicative of a fourth static pressure in the second section of the second primary line. It should be understood, however, that any combination of sensors may be possible. For example, the disclosed techniques may utilize the first sensor and the second sensor, or the first sensor, the third sensor, and the fourth sensor, or some combination thereof. The controller, which communicates with the pressure sensors, monitors the pressures in the system and generates warnings for an operator based on the monitored pressures (e.g., when the monitored pressures fall outside of desired ranges).

To help illustrate, a side view of an embodiment of an air cart 10 that may be used in conjunction with a towable agricultural implement to deposit seeds into the soil is shown in FIG. 1. More specifically, the air cart 10 may be used to centrally store seeds and distribute the seeds to the agricultural implement. Accordingly, in the illustrated embodiment, the air cart 10 includes a storage tank 12 (having a lid 13), a frame 14, wheels 16, a metering assembly 18, and one or more air sources 20. In the depicted embodiment, the air cart frame 14 may be coupled to the agricultural implement or an off-road work vehicle via a hitch 19. As such, the wheels 16 may contact the soil surface to enable the air cart 10 to be towed. As will be appreciated, in some embodiments, the air cart 12 and the implement may be part of a single unit.

Additionally, the storage tank 12 may centrally store the seeds before distribution. In some embodiments, the storage tank 12 may include multiple compartments for storing various flowable granular products. For example, one compartment may include seeds, such as canola or mustard, and another compartment may include a dry fertilizer. In such embodiments, the air cart 10 may distribute the seeds, the fertilizer, or a mixture thereof to the agricultural implement.

Furthermore, as depicted, the metering assembly 18 is coupled to the bottom of the storage tank 12. More specifically, the metering assembly 18 may enable seeds stored in the storage tank 12 to be gravity fed into the metering assembly 18. The metering system 18 may then control the flow of seeds into an air stream generated by the one or more air sources 20, thereby controlling seed distribution to the row units for deposition into the soil. In some embodiments, the air sources 20 may be pumps or blowers powered by an electric or hydraulic motor, for example.

Figure 2:
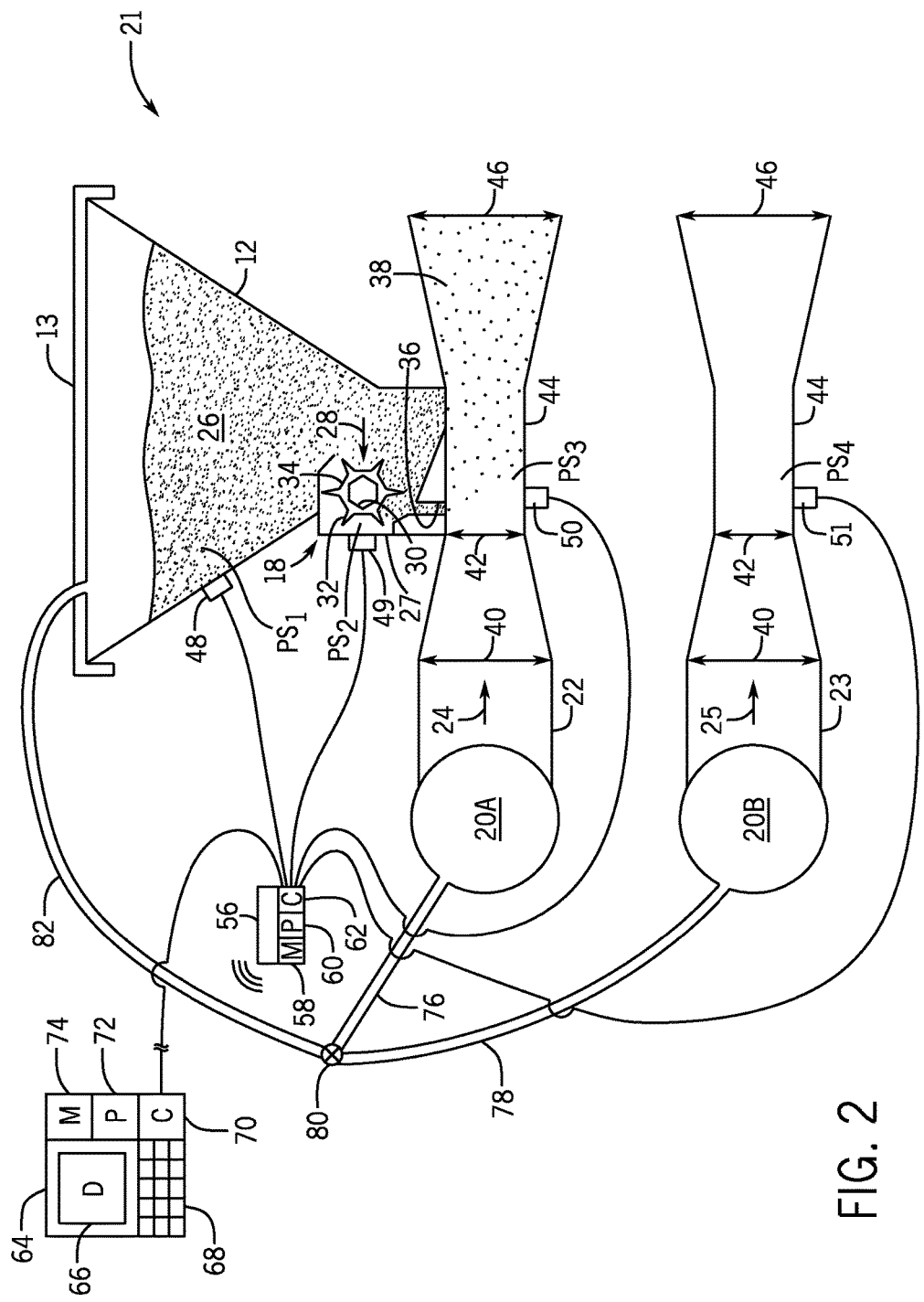
FIG. 2 is a schematic diagram of the agricultural product distribution system of FIG. 1, in accordance with an embodiment.

To more clearly illustrate, a schematic view of a pneumatic distribution system 21 is shown in FIG. 2. As illustrated, the pneumatic distribution system 21 includes first and second air sources 20A, 20B, the storage tank 12, and the metering assembly 18. More specifically, a first primary line 22 is used to guide an air stream 24 generated by the first air source 20A past the metering assembly 18. It should be understood that a system having multiple metering assemblies 18 may have multiple primary lines 22. For example, a second primary line 23 is shown fluidly coupled to the second air source 20B. The first and second air sources 20A, 20B may be configured to blow air at different rates. For example, an operator may use the first air source 20A running at low revolutions per minute (rpm) and the first primary line 22 for low product deposition rates. An operator may use the second air source 20B running at high rpm and the second primary line 23 for high product deposition rates.

The metering assembly 18 includes a meter housing 27 and a meter roller 28 to control the flow of seeds 26 into the air streams 24, 25. Although only one meter roller 28 is depicted, in other embodiments the metering assembly 18 may include multiple meter rollers 28 disposed adjacent to one another (e.g., along a lateral axis of the air cart).

As depicted, the meter roller 28 includes an interior cavity 30, which may receive a shaft that drives the meter roller 28 to rotate. In the depicted embodiment, the cavity 30 has a hexagonal cross section. However, alternative embodiments may include various other cavity configurations (e.g., triangular, square, keyed, splined, etc.). In some embodiments, the shaft may be coupled to a drive unit, such as an electric or hydraulic motor, to rotate the meter roller 28. Additionally or alternatively, the meter roller 28 may be coupled to the wheel 16 of the air cart 10 by a gear assembly such that rotation of the wheel 16 drives the meter roller 28 to rotate. Such a configuration automatically varies the rotation rate of the meter roller 28 based on the speed of the air cart 10.

Additionally, the meter roller 28 may include multiple flutes 32 and recesses 34. The number and geometry of the flutes 32 may be selected to accommodate the seeds 26 being distributed. For example, in the illustrated embodiment, the meter roller 28 includes six flutes 32 and a corresponding number of recesses 34. In other embodiments, the meter roller 28 may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 may be selected to accommodate the agricultural product 26 within the storage tank 12. For example, a meter roller 28 having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal axis) and flute angle (i.e., angle of the flute relative to a radial axis) may also be varied in alternative embodiments.

The rotation rate of the meter roller 28 may control the flow of the seeds 26 into the air flows 24, 25. For example, as the meter roller 28 rotates, seeds 26 held in a recess 34 of the meter roller 28 are transferred through an outlet 36 into one of the first or second primary lines 22, 23. The seeds 26 may then be entrained in one of the air stream 24, 25, thereby forming an air/seed mixture 38. The mixture 38 may then flow toward the row units of the agricultural implement, where the seeds and/or fertilizer are deposited within the soil.

As depicted, each of the primary lines 22, 23 converge from a first cross-sectional area 40 to a second cross-sectional area 42 before reaching the outlet 36, and then diverge to a third cross-sectional area 46 once the air/seed mixture 38 is formed. As shown, the first cross-sectional area 40, the second cross sectional area 42, and/or the third cross-sectional area 46 may be different from one another. Differences in the static pressure in the storage tank 12, the static pressure in the meter housing 27, and the static pressure in the primary line 22, 23 being used may affect the flow rate of seeds 26 out of the storage tank 12 and into the primary line 22, 23. Changes in cross-sectional area of the primary line 22, 23 may create pressure variations in the primary line 22, 23 (e.g., in a Venturi section 44) induced by the Venturi effect. Variations in the static pressure of the storage tank 12, the static pressure in the meter housing 27, and the static pressure of the primary line 22, 23 may also result from factors other than the Venturi effect. For example, when ΔP, the pressure differential across the meter roller 28, is greater than desired (e.g., the static pressure in the storage tank 12 is more than a desired value above the static pressure in the meter housing 27 and/or the static pressure in the primary line 22, 23 in use), seeds 26 may flow out of the storage tank 12 at a higher rate than desired. Alternatively, when ΔP is lower than desired (e.g., the static pressure in the primary line 22, 23 in use and/or the static pressure in the metering section exceeds the static pressure in the storage tank 12), seeds 26 may flow out of the storage tank 12 at a rate lower than desired, or not at all.

As such, one way to monitor the flow of seeds 26 into the primary line 22, 23 is to measure ΔP, the pressure differential across the meter roller 28 (e.g., by monitoring the static pressure [PS1] in the storage tank 12, and the static pressure [PS2] in the meter housing 27, and/or the static pressure [PS3, PS4] in the primary line 22, 23 through which product is flowing, and to generate an alert for an operator when the ΔP falls outside of the desired range. More specifically, a first pressure sensor 48 may be fluidly coupled to the storage tank 12 to facilitate determining PS1. A second pressure sensor 49 may be fluidly coupled to the meter housing 27 (e.g., disposed inside the meter housing 27 at the edge of the meter roller 28) to facilitate determining PS2. A third pressure sensor 50 may be fluidly coupled to the first primary line 22 to facilitate determining PS3, and a fourth pressure sensor 51 may be fluidly coupled to the second primary line 23 to facilitate determining PS4. If the pneumatic distribution system 21 includes more than one primary line 22, 23, as shown in FIG. 2, each primary line 22, 23 may have its own pressure sensor 50, 51. One advantage of having a pressure sensor fluidly coupled to the meter housing 27 (rather than a pressure sensor fluidly coupled to the primary lines 22, 23) is that in configurations with multiple primary lines 22, 23, only one pressure sensor 49 is utilized, rather than a pressure sensor 50, 51 for each primary line 22, 23. Each pressure sensor is configured to output a respective signal indicative of the detected pressure. As previously discussed, it should be understood that any combination of pressure sensors may be possible. For example, in one embodiment, the pneumatic distribution system 21 may include only the first pressure sensor 48 and the second pressure sensor 49. In another embodiment, the system 21 may include the first pressure sensor 48, the third pressure sensor 50, and the fourth pressure sensor 51. In yet another embodiment, the system 21 may include all four of the pressure sensors 48, 49, 50, and 51. It should be understood, however, that the specifically listed embodiments are not intended to be limiting and are merely examples. Accordingly, many other combinations of pressure sensors, with additional or fewer pressure sensors may be possible. Furthermore, each of the pressure sensors may be positioned at any suitable location to detect the respective pressure. For example, the first pressure sensor 48 may be positioned at any of a variety of locations within the storage tank.

To facilitate measuring the static pressures PS1, PS2, PS3, and PS4, a controller 56 may be communicatively coupled to the first pressure sensor 48, the second pressure sensor 49, the third pressure sensor 50, and the fourth pressure sensor 51. The controller 56 may include a processor 60 and a memory 58. In some embodiments, the processor 60 may include one or more general purpose processors, one or more application specific integrated circuits, one or more field programmable gate arrays, or the like. Additionally, the memory 58 may be any tangible, non-transitory, computer readable medium that is capable of storing instructions executable by the processor 60 and/or data that may be processed by the processor 60. In other words, the memory 58 may include volatile memory, such as random access memory, or non-volatile memory, such as hard disk drives, read only memory, optical disks, flash memory, and the like. The controller 56 may also include communication circuitry 62 for communication with an operator interface 64 via a wired or wireless connection.

The controller 56 may determine PS1 based on signals received from the first pressure sensor 48, PS2 based on the signals received from the second pressure sensor 49, PS3 based on signals received from the third pressure sensor 50, and PS4 based on signals received from the third pressure sensor 51. In some embodiments, the controller 56 may also calculate differences between measured pressures PS1, PS2, PS3, PS4, and determine whether the measured pressures and/or pressure differences are within a desired range. The desired range may be predetermined and stored within the memory 58, for example.

The operator interface 64 may be remote from the controller 56 (e.g., in the cab of the vehicle towing the pneumatic distribution system 21), or adjacent to the controller 56. In some embodiments, the controller 56 and the operator interface 64 may be combined into a single component. In such an embodiment, the controller 56 and the operator interface 64 may share processors 60, 72, and/or memory components 58, 74.

The operator interface 64 may include a display 66, a user input 68, communication circuitry 70, a processor 72, and a memory component 74. The display 66 may a plasma display, a liquid crystal display (LCD), a cathode ray tube (CRT) display, an array of LEDs, or some other display. The display 66 may be incorporated into the dashboard of the vehicle towing the system 21, or may be part of a smart phone, a tablet, a GPS device, a computer, or some other device used by the operator. The user input 68 may be incorporated into the display 66 (e.g., a touchscreen) or separate from the display 66. The user input 68 may comprise a keyboard, a mouse, a touch pad, an array of buttons, or some other input.

The communication circuitry 70 of the operator interface 64 may be configured to communicate with the communication circuitry 62 of the controller 56 via a wired or wireless connection. The processor 72 may include one or more general purpose processors, one or more application specific integrated circuits, one or more field programmable gate arrays, and the like. The memory 74 may be any tangible, non-transitory, computer readable medium that is capable of storing instructions executable by the processor 72 and/or data that may be processed by the processor 72. The memory 74 may include volatile memory, such as random access memory, or non-volatile memory, such as hard disk drives, read only memory, optical disks, flash memory, and the like.

It should be understood, however, that the embodiment described above is merely one embodiment and that other configurations may be possible. For example, other embodiments may only have the first pressure sensor 48 fluidly coupled to the storage tank 12 and the second pressure sensor 49 fluidly coupled to the meter housing 27. Still other embodiments may only have the first pressure sensor 48 fluidly coupled to the storage tank 12 and third and/or fourth pressure sensors 50, 51 fluidly coupled to the primary lines 22, 23. Yet another embodiment may have the third and/or fourth pressure sensors 50, 51 fluidly coupled to the primary lines 22, 23 and a second pressure sensor 49 fluidly coupled to the meter housing 27. In each of these embodiments, the described techniques may be used to monitor pressures in the system 21 and generate an alert when the relationships between measured pressures are outside of a respective desired range. In some embodiments, the alerts or warnings generated by the controller 56 may recommend a course of action to the operator or suggest that the operator check specific settings or components.

As shown, a first pneumatic line 76 (e.g., hose, pipe, etc.) may be fluidly coupled to the first air source 20A, and a second pneumatic line 78 may be fluidly coupled to the second air source 20A. The first and second pneumatic lines 76, 78 may be fluidly coupled to a valve 80 (e.g., a ball valve). The ball valve 80 may be fluidly coupled to a third pneumatic line 82 that is fluidly coupled to the tank 12. When the ball valve 80 is in a first position, the first pneumatic line 76 is fluidly coupled to the tank 12, and thus, the first air source 20A pressures the tank 12. When the ball valve 80 is in a second position, the second pneumatic line 78 is fluidly coupled to the tank 12, and thus, the second air source 20B pressurizes the tank 12. In some embodiments, it may be desirable for the first air source 20A to pressurize the tank 12 when the first primary line 22 is being used to distribute seeds 26 and for the second air source to 20B pressurize the tank 12 when the second primary line 23 is being used to distribute seeds 26. Accordingly, a warning generated by the controller 56 in response to pressure differential outside of the desired range may suggest that the operator check the ball valve setting. Similarly, a warning generated by the controller 56 may suggest that the operator check the lid 13 of the tank 12.

Figure 3:
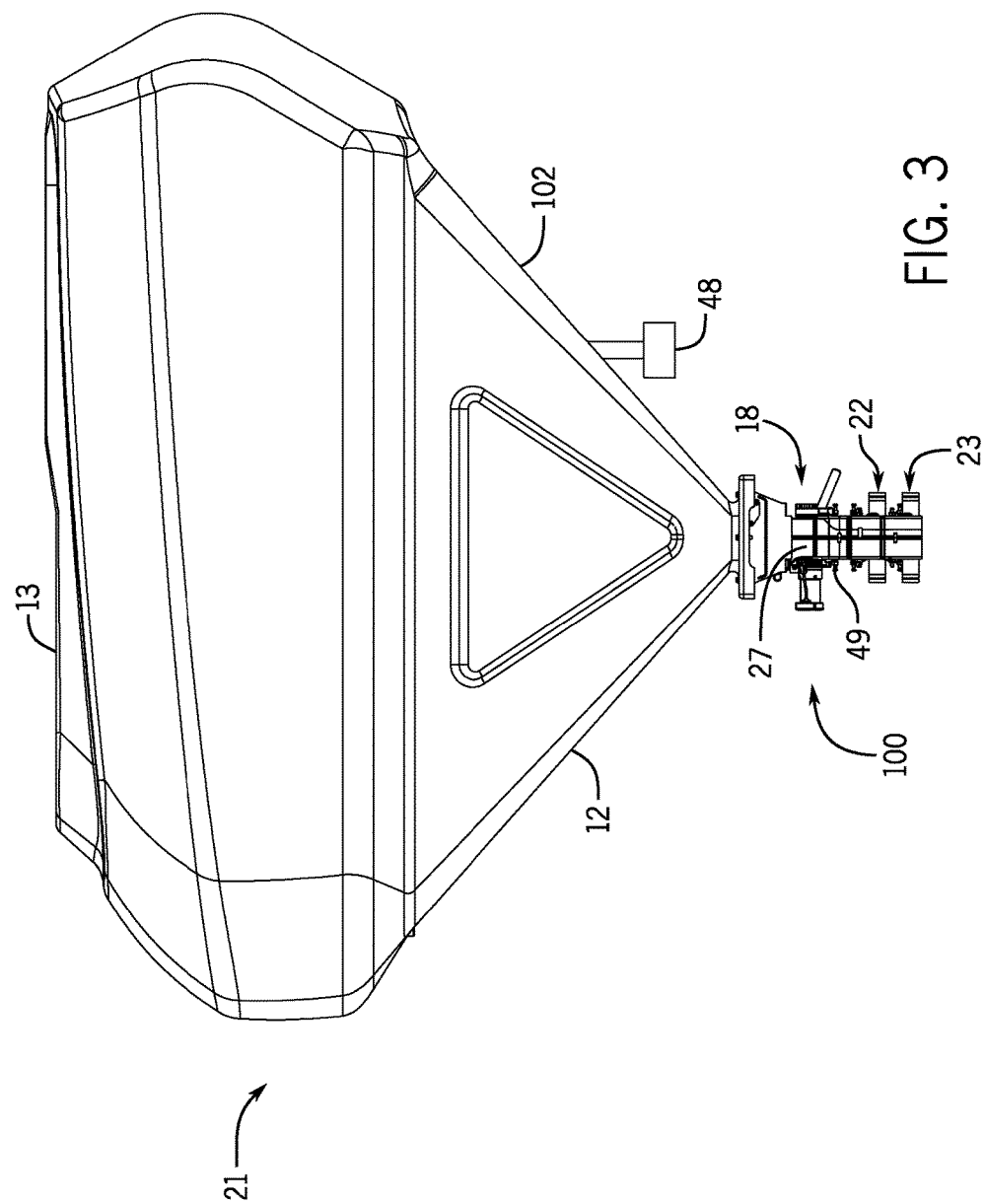
FIG. 3 is a side view of one meter bank of the agricultural product distribution system, in accordance with an embodiment.

FIGS. 3-6 show one embodiment of the system 21 having the first pressure sensor 48 coupled to the product tank 12 and the second sensor 49 coupled to the meter housing 27 just after (e.g., downstream of) the meter roller 28 termination edge. FIG. 3 is a side view of one meter bank 100 of the pneumatic distribution system 21. A meter bank 100 comprises one or more metering assemblies 18 that receive seeds 26, or other product, from a single storage tank 12. An embodiment of the pneumatic distribution system 21 may include one or more meter banks 100, each with a pair of pressure sensors 48, 49. As shown in FIG. 3, the first pressure sensor 48 may be coupled to a side 102 of the tank 12. The second sensor 49 may be coupled to a side of the meter housing 27, downstream of the meter roller 28 termination edge. For example, the second sensor 49 may be disposed substantially adjacent to the middle of the meter housing 27, at the meter roller 27 discharge area.

Figure 4:
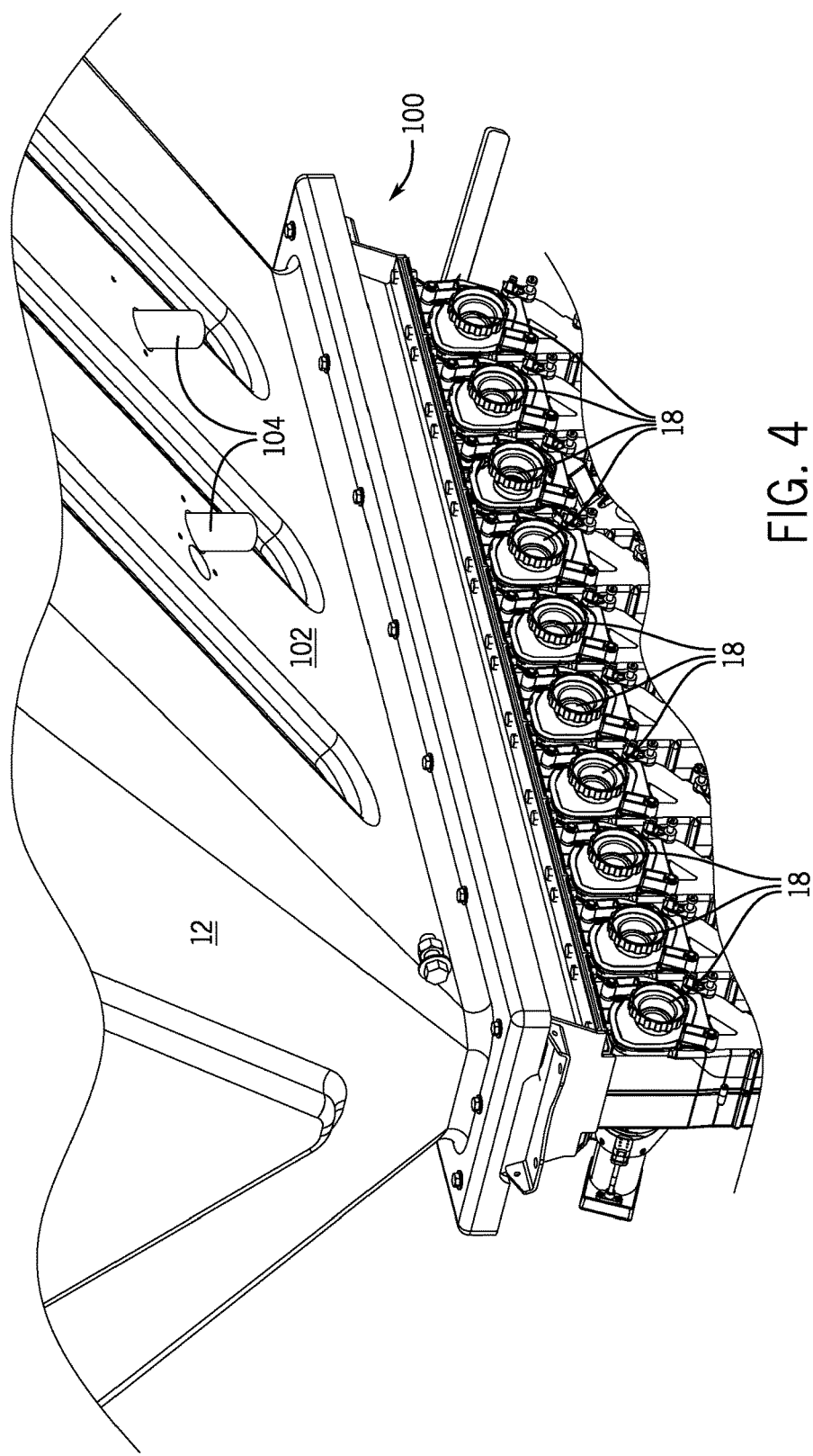
FIG. 4 is a perspective view of a portion of the meter bank shown in FIG. 3, in accordance with an embodiment.

FIG. 4 is a perspective view of the meter bank 100 shown in FIG. 3. In the embodiment shown, the meter bank 100 comprises ten metering assemblies 18, however, the meter bank 100 may include any number of metering assemblies 18. As previously discussed, seeds 26 or other product disposed in the tank 12 is fed into the various metering assemblies 18 for distribution into the various primary lines 22. The tank 12 may be outfitted with one or more ports 104 installed on the side of the tank for coupling one or more pressure sensors 48 to the tank 12 for determining PS1, the static pressure inside the tank 12. As shown in FIG. 4, the ports 104 may be disposed on the side 102 of the tank 12. In one embodiment, there may only be one pressure sensor 48 per tank 12. In other embodiments, there may be multiple pressure sensors 48 per tank 12. Furthermore, a tank may be outfitted with more than one adapter fitting 104, as shown in FIG. 4, but only a single pressure sensor 48.

Figure 5:
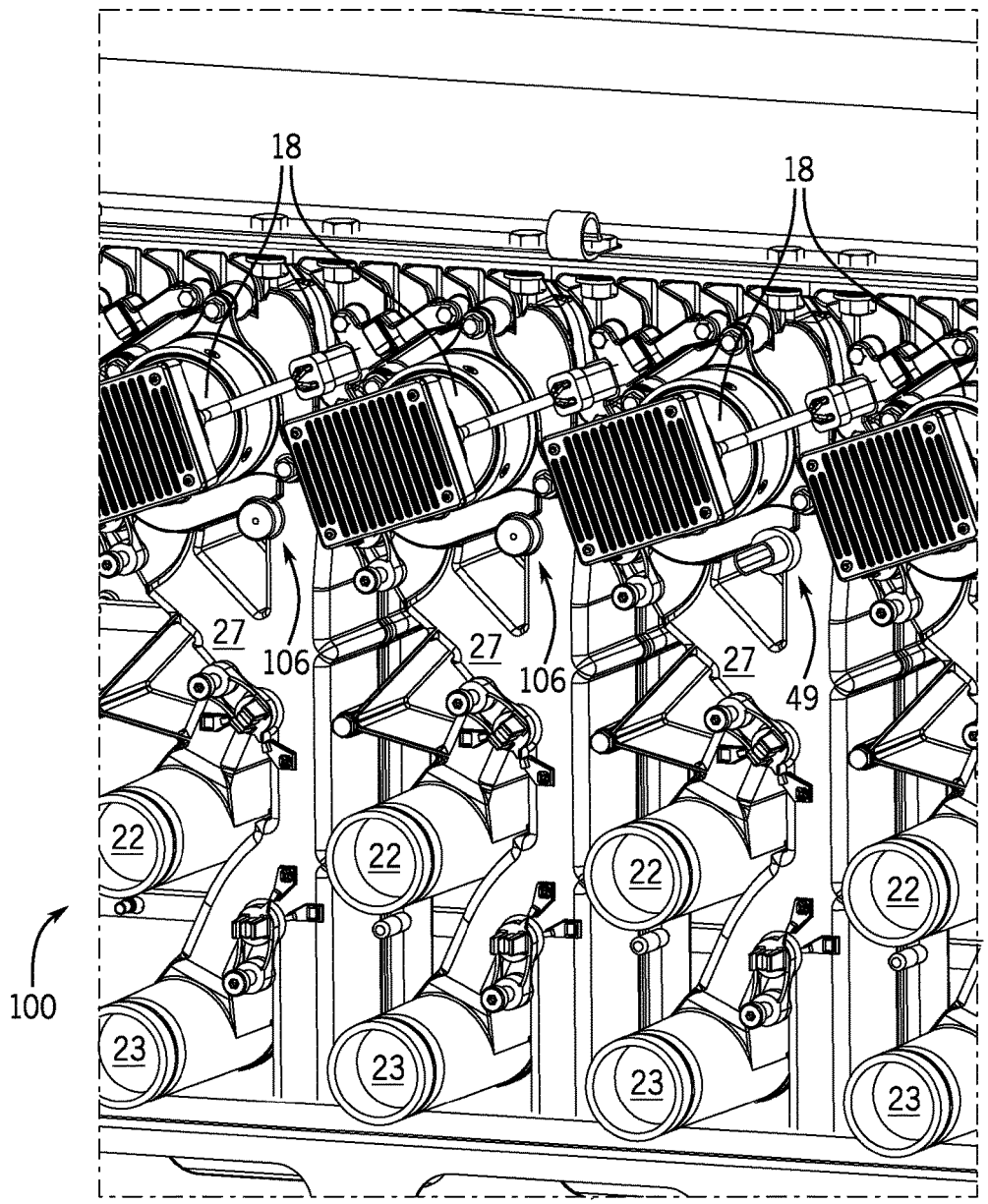
FIG. 5 is a perspective detail view of a portion of the meter bank shown in FIGS. 3 and 4, in accordance with an embodiment.

FIG. 5 is a perspective detail view of the meter bank 100 shown in FIGS. 3 and 4. As previously discussed, the metering assemblies 18 receive seeds 26 or other product from the tank 12. The meter rollers 28 rotate within meter housings 27, affecting the rate at which seeds 26 are distributed to the primary lines 22, 23. Each meter housing 27 may include a port 106 disposed at the roller discharge area, downstream of the meter roller 28. The second pressure sensor 49 may be coupled to one or more of the ports 106 for determining PS2, the pressure in the meter housing 27 downstream of the meter roller 28. Though only one of the ports 106 shown in FIG. 5 has a pressure sensor 49 attached, it should be understood that any or all of the ports 106 may be coupled to a respective pressure sensor 49.

Figure 6:
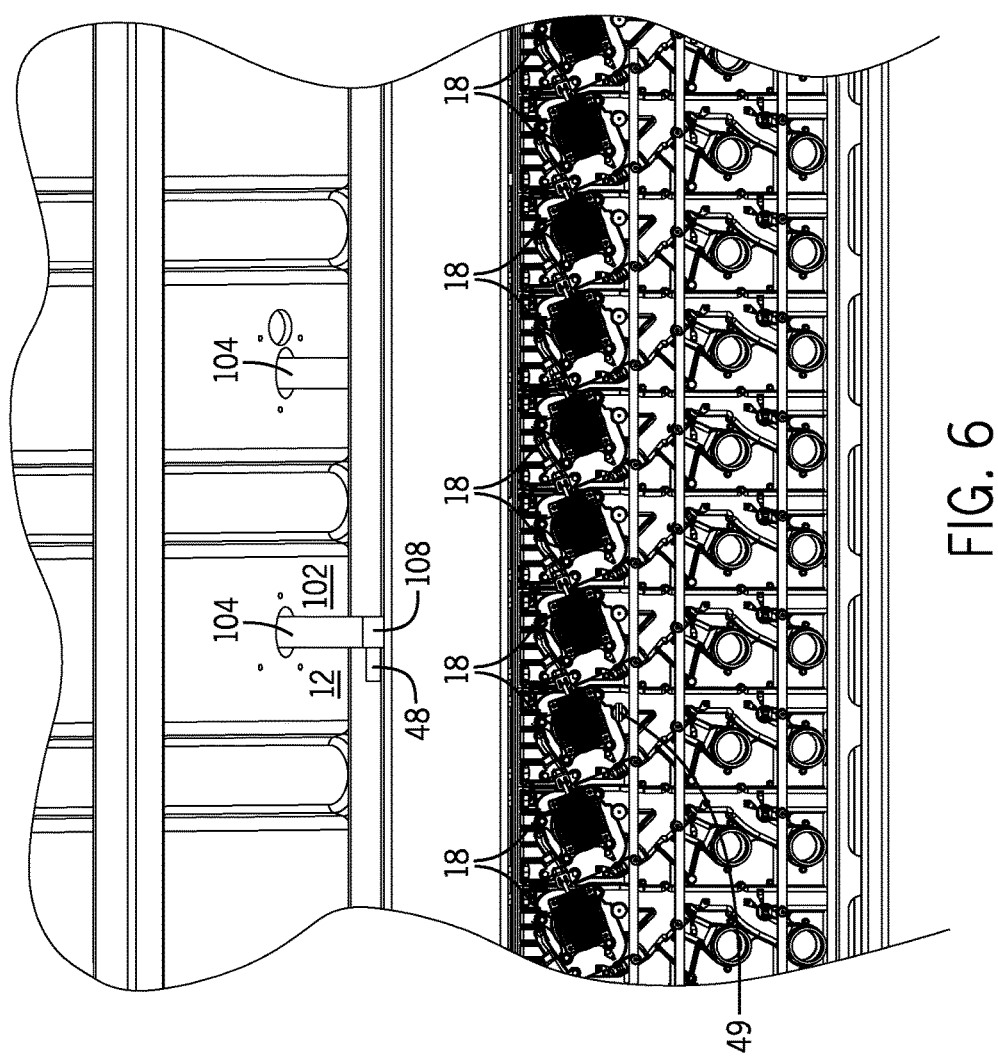
FIG. 6 is a detail side view of a portion of the meter bank, in accordance with an embodiment.

FIG. 6 is a detail side view of the meter bank 100. FIG. 6 shows two ports 104 coupled to the side 102 of the tank 12, though any number of ports 104 may be provided. An adapter fitting 108 and pressure sensor 48 may be coupled to one or more of the ports 104. Though only one of the ports 104 shown has an adapter fitting 108 and a pressure sensor 48 attached, any number of ports 104 may be coupled to a respective adapter fitting 108 and pressure sensor 48. Similarly, each metering assembly 18 shown includes the port 106 attached to the meter housing 27. The second pressure sensor 49 is shown attached to one of the ports 106 such that the meter bank 100 includes a single pressure sensor downstream of the meter rollers 28. However, any number of the metering assemblies 18 may have a pressure sensor 49 coupled to the meter housing 27 downstream of the meter roller 28.

The embodiment shown in FIGS. 3-6 include one pressure sensor 48 disposed on the non-pressurized leg of the tank 12 ladder for determining PS1, the static pressure in the tank, and a second pressure sensor 49 disposed downstream of the meter roller 28 for determining PS2, the static pressure in the meter housing 27 downstream of the meter roller 28. It should be understood, however, that other embodiments may include additional pressure sensors in these or other locations. By subtracting the pressure detected by the pressure sensor 48 upstream of the meter roller 28 (e.g., on the side 102 of the tank 12) and the pressure detected by the pressure sensor 49 downstream of the meter roller 28 (e.g., on the meter housing 27 at the roller discharge area), ΔP, the pressure differential across the meter roller 28 may be determined. If the measured pressures PS1, PS2, and/or ΔP falls outside of a desired range, an alert may be generated and provided to the operator (e.g., via the operator interface 64). It should be understood, however, that the embodiment shown in FIGS. 3-6 and described in the corresponding discussion is merely one embodiment and that other embodiments may be possible. For example, as shown in FIG. 2, one or more pressure sensors 50, 51 may be coupled to each of the primary lines 22, 23 and configured to measure PS3, the static pressure in the first primary line 22, and PS4, the static pressure in the second primary line 23. These pressure sensors 50, 51 may replace or be in addition to the pressure sensor 49 coupled to the meter housing 27.

Figure 7:
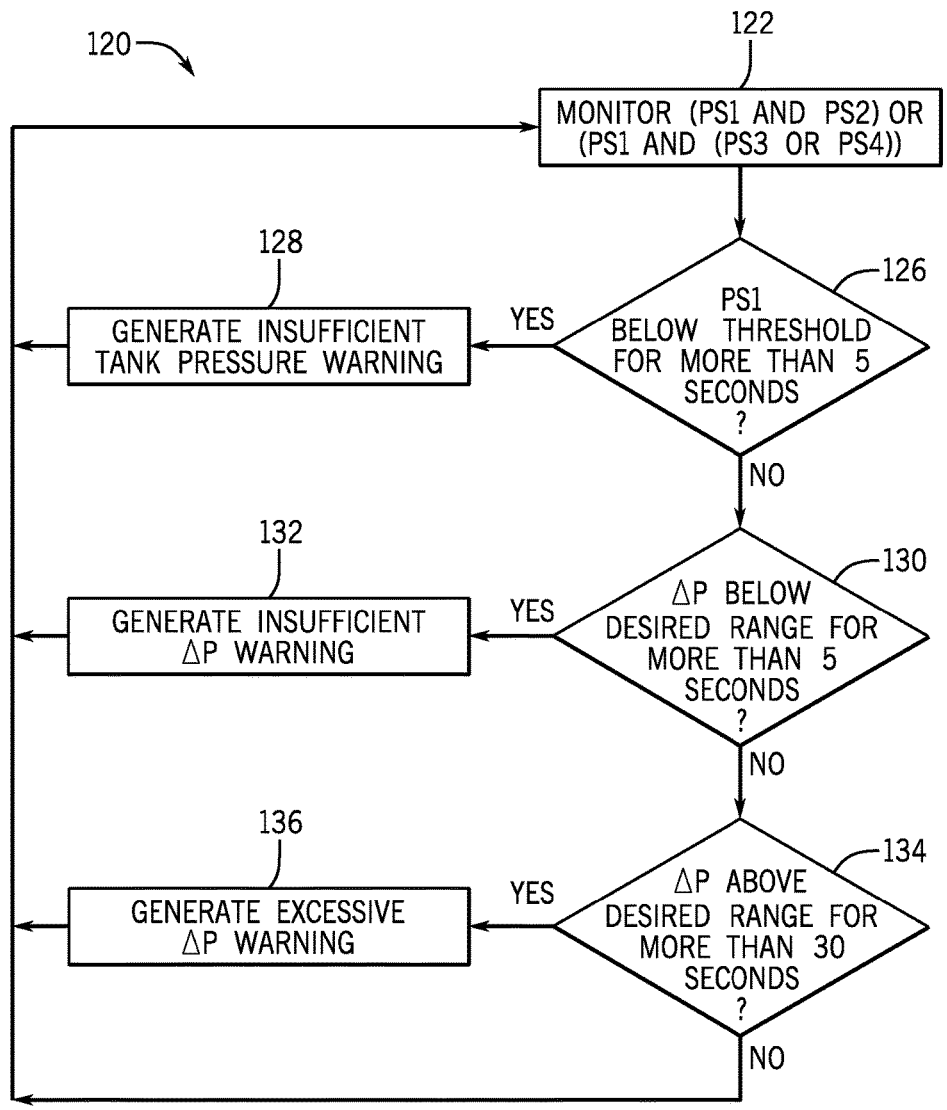
FIG. 7 is a flow chart of a process for monitoring pressures in an agricultural distribution system, in accordance with an embodiment.

FIG. 7 is a flow chart of a process 120 for monitoring pressures in a pneumatic distribution system 21. In block 122, the controller 56 monitors the PS1, static pressure in the tank 12, and PS2, the static pressure in the meter housing 27 at the meter discharge area. In some embodiments, however, the controller 56 may monitor PS1, static pressure in the tank 12, and either PS3, the static pressure in the first primary line 22, or PS4, the static pressure in the second primary line 22, depending upon which primary line 22, 23 is in use, instead of or in addition to PS2. The controller may also determine ΔP, the pressure differential across the meter assembly 18 based on PS1, PS2, PS3, and/or PS4.

In decision 126, the controller 56 determines whether the PS1 is below the set threshold value. As with the desired range for ΔP, the PS1 threshold may be set directly (e.g., the threshold input by the user) or indirectly (e.g., threshold determined by an algorithm based on factors such as desired feed rate, conditions, speed of the vehicle, type of product, etc.). For example, the PS1 threshold may be any value between about 0.1 and 1 kPa. For example, the PS1 threshold may be about 0.1, 0.2, 0.3, 0.4, 0.5, 0.6, 0.7, 0.8, 0.9, or 1 kPa. If PS1 is below the threshold value for a period of time (e.g., about five seconds), the controller generates an insufficient tank pressure warning (block 128), and outputs the warning to the operator interface 64 for display to the operator. As with the desired ΔP ranges and PS1 threshold, the period of time that triggers a warning may be directly or indirectly set, or the period of time may be written into the software code. After the warning is generated, the controller 56 may return to monitoring pressures within the system 21 (block 122). If PS1 is equal to or greater than the PS1 threshold, the controller 56 proceeds to decision 130.

At decision 130, the controller 56 determines whether ΔP is below the desired range for a period of time (e.g., about five seconds). The desired range may be set directly (e.g., the specific range limits input by the user) or indirectly (e.g., range limits determined by an algorithm based on factors such as desired feed rate, conditions, speed of the vehicle, type of product, etc.). The desired range may be stored, such as in the memory 58. For example, a bottom end of the desired range for ΔP may be any value between about 0 and 1 kPa. For example, the bottom end of the desired range for ΔP may be about 0, 0.1, 0.2, 0.3, 0.4, 0.5, 0.6, 0.7, 0.8, 0.9, or 1 kPa. If ΔP is below the desired range for the set period of time, the controller 56 generates an insufficient ΔP warning (block 132), and outputs the warning to the operator interface 64 for display to the operator. After the warning is generated, the controller 56 may return to monitoring pressures within the system 21 (block 122). If ΔP is not below the desired ΔP range, the controller 56 proceeds to decision 134.

At decision 134, the controller 56 determines whether ΔP is above the desired range for a period of time (e.g., about thirty seconds). A top end of the desired range for ΔP may be any value between 1.5 and 3.5 kPa. For example, the top end of the desired range for ΔP may be about 1.5, 1.6, 1.7, 1.8, 1.9, 2, 2.1, 2.2, 2.3, 2.4, 2.5, 2.5, 2.6, 2.7, 2.8, 2.9, 3, 3.1, 3.2, 3.3, 3.4, or 3.5 kPa. If ΔP is above the desired range for the set period of time, the controller 56 generates an excessive ΔP warning (block 136), and outputs the warning to the operator interface 64 for display to the operator. After the warning is generated, the controller 56 may return to monitoring pressures within the system 21 (block 122). If ΔP is not above the desired ΔP range, the controller 56 may return to monitoring pressures within the system 21 (block 122).

Figure 8:
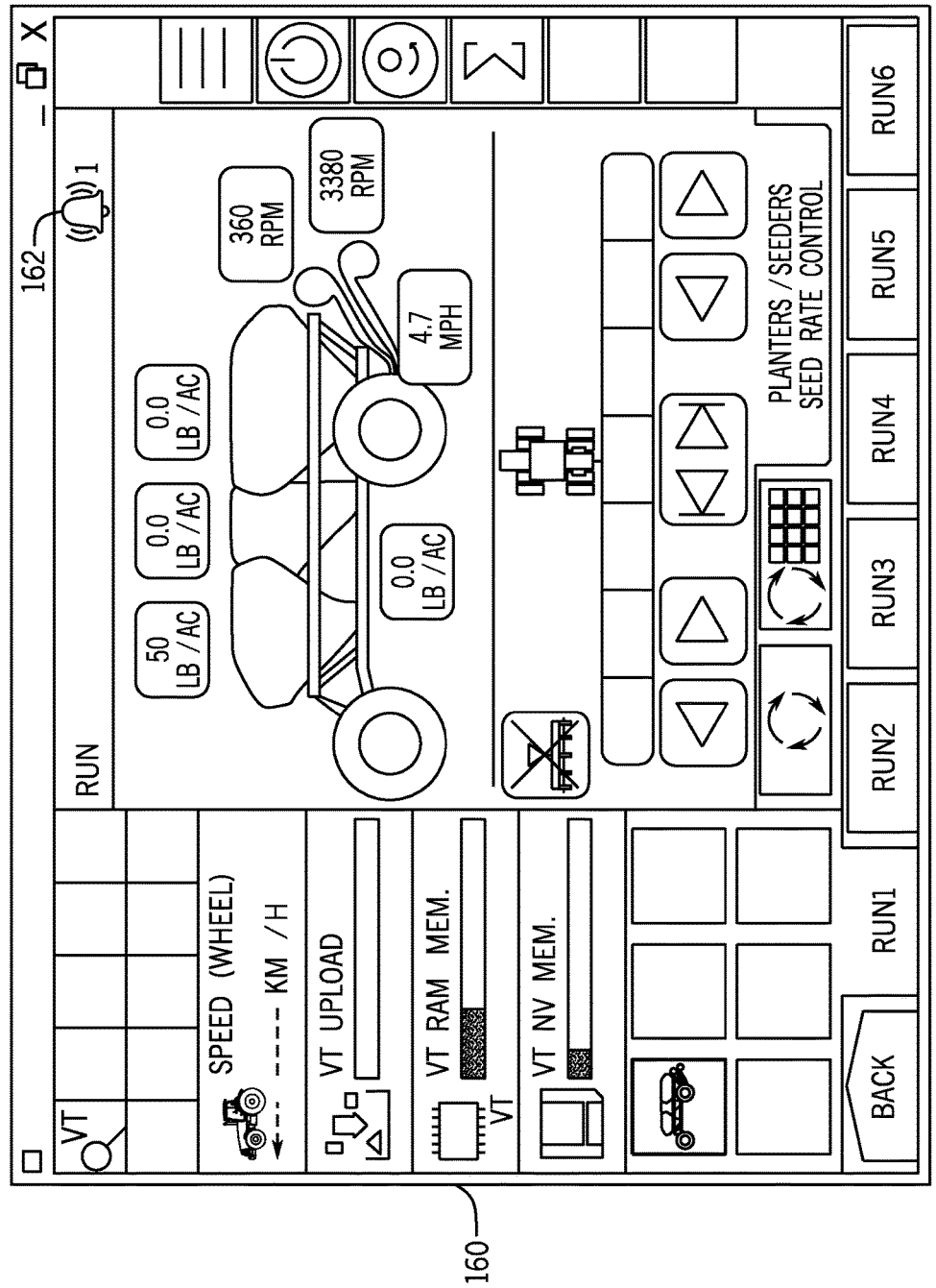
FIG. 8 is a screen that may be displayed to an operator via a display of an operator interface, in accordance with an embodiment.

FIG. 8 shows one embodiment of a screen that may be displayed to the operator via the display 66 of the operator interface 64. As the user is operating the pneumatic distribution system 21, screen 160, or a similar screen may be displayed to the operator inside of the cab of the vehicle towing the system 21. The screen 160 may include various images and/or data fields that allow the operator to monitor the operations of the system 21. For example, the pressure detected by the respective pressure sensors, the calculated pressure differential, and/or the desired range may be displayed on the display 66 of the interface 64. The bell icon 162 may indicate that one or more warning have been generated by the control system 56. As will be discussed in more detail with regard to FIGS. 9-11, in some embodiments, the warnings generated by the controller 56 may be displayed as popups, or the bell icon 162 may appear, prompting the operator to view the warnings. The operator interface 64 may use various techniques to gain the operator's attention. For example, the operator interface 64 may use noises, bright lights, flashing, and the like to obtain the operator's attention. Additionally, as shown in FIG. 8, a number may be displayed along with the bell icon 162 that indicates the number of warnings awaiting the operator. For example, if the controller 56 has generated three warnings, a number "3" may be displayed along with the bell icon 162. In some embodiment, audible warnings may additionally or alternatively be provided (e.g., via a speaker).

Figure 9:
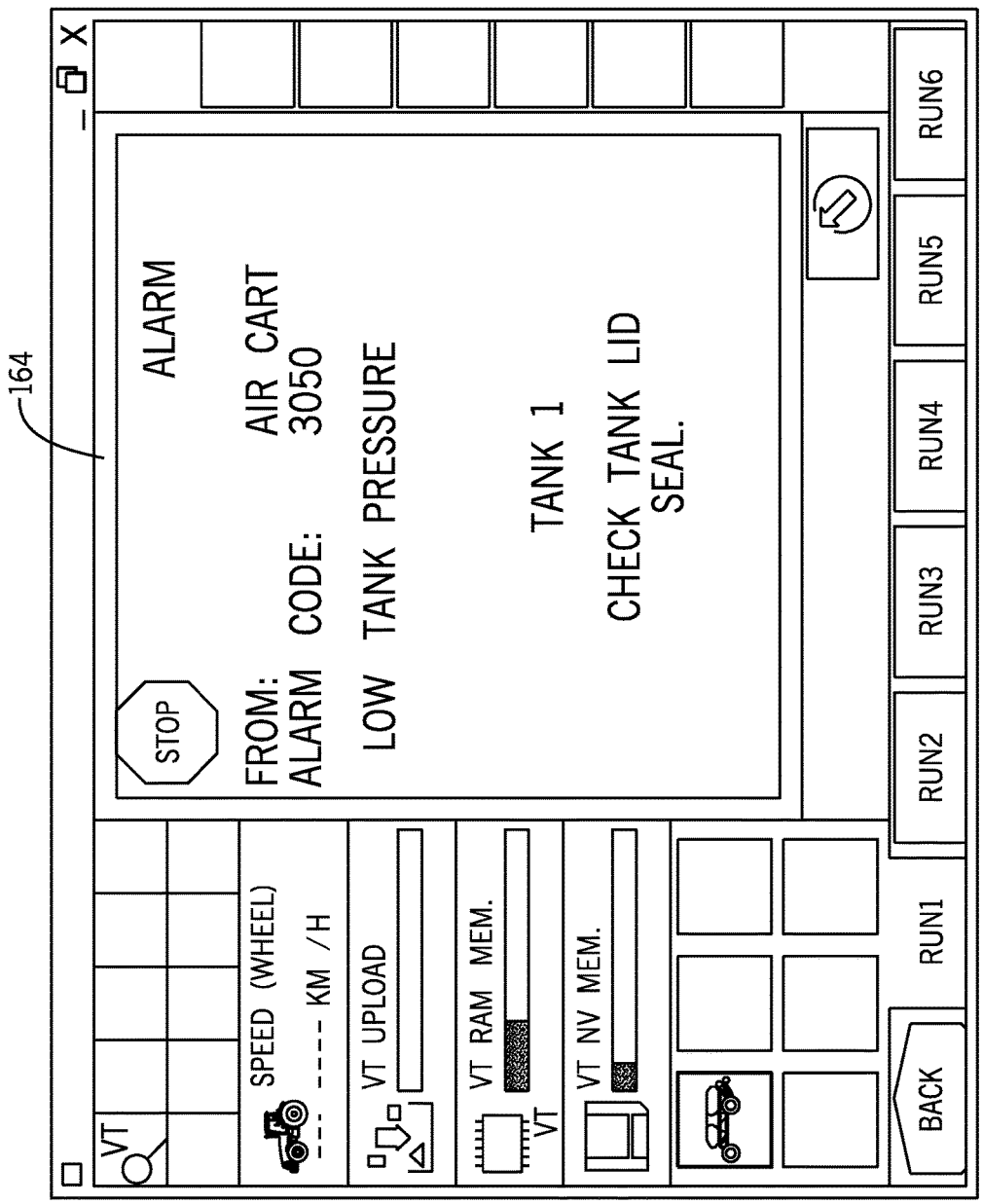
FIG. 9 is a screen showing an insufficient tank pressure (PS1) warning, in accordance with an embodiment.

FIG. 9 is one embodiment of an insufficient tank pressure (PS1) warning 164. As shown, the insufficient tank pressure warning 164 may include a warning that the tank 12 pressure (PS1) is low, as well as an identification of which tank 12 has low pressure, and one or more possible actions for the operator to take to resolve the issue (e.g., check the tank lid 13 seal). The warning 164 may arise if the measured tank pressure PS1 is below a set threshold value. The warning 164 may be displayed on the display 66 of the operator interface 64 as a pop up, or the warning 164 may be displayed after the user selects an icon (e.g., bell icon 162) on the main screen 160. In some embodiment, audible warnings may additionally or alternatively be provided (e.g., via a speaker).

Figure 10:
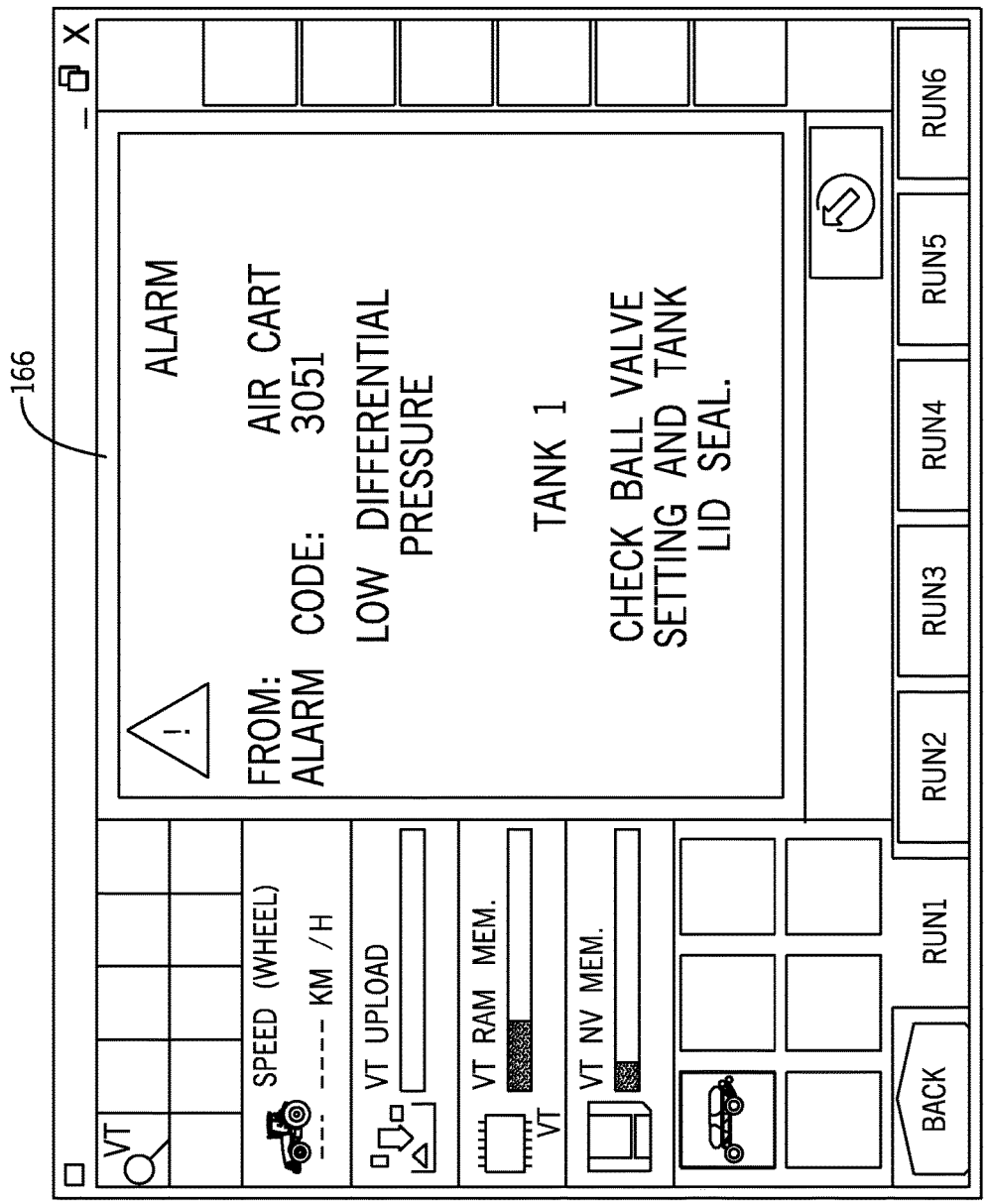
FIG. 10 is a screen showing an insufficient pressure differential (ΔP) warning, in accordance with an embodiment.

FIG. 10 is one embodiment of an insufficient ΔP warning 166. As shown, the insufficient ΔP warning 166 may include a warning that the ΔP (pressure differential across the metering assembly 18) is low, as well as an identification of which tank 12 is affected, and one or more possible actions for the operator to take to resolve the issue (e.g., check the ball valve 80 setting and the tank lid 13 seal). The warning 166 may arise if the difference between the static pressure (PS1) upstream of the metering assembly 18 and static pressure (PS2, PS3, or PS4) downstream of the metering assembly 18 is below a desired range. The warning 166 may be displayed on the display 66 of the operator interface 64 as a pop up, or the warning 166 may be displayed after the user selects an icon (e.g., bell icon 162) on the main screen 160. In some embodiment, audible warnings may additionally or alternatively be provided (e.g., via a speaker).

Figure 11:
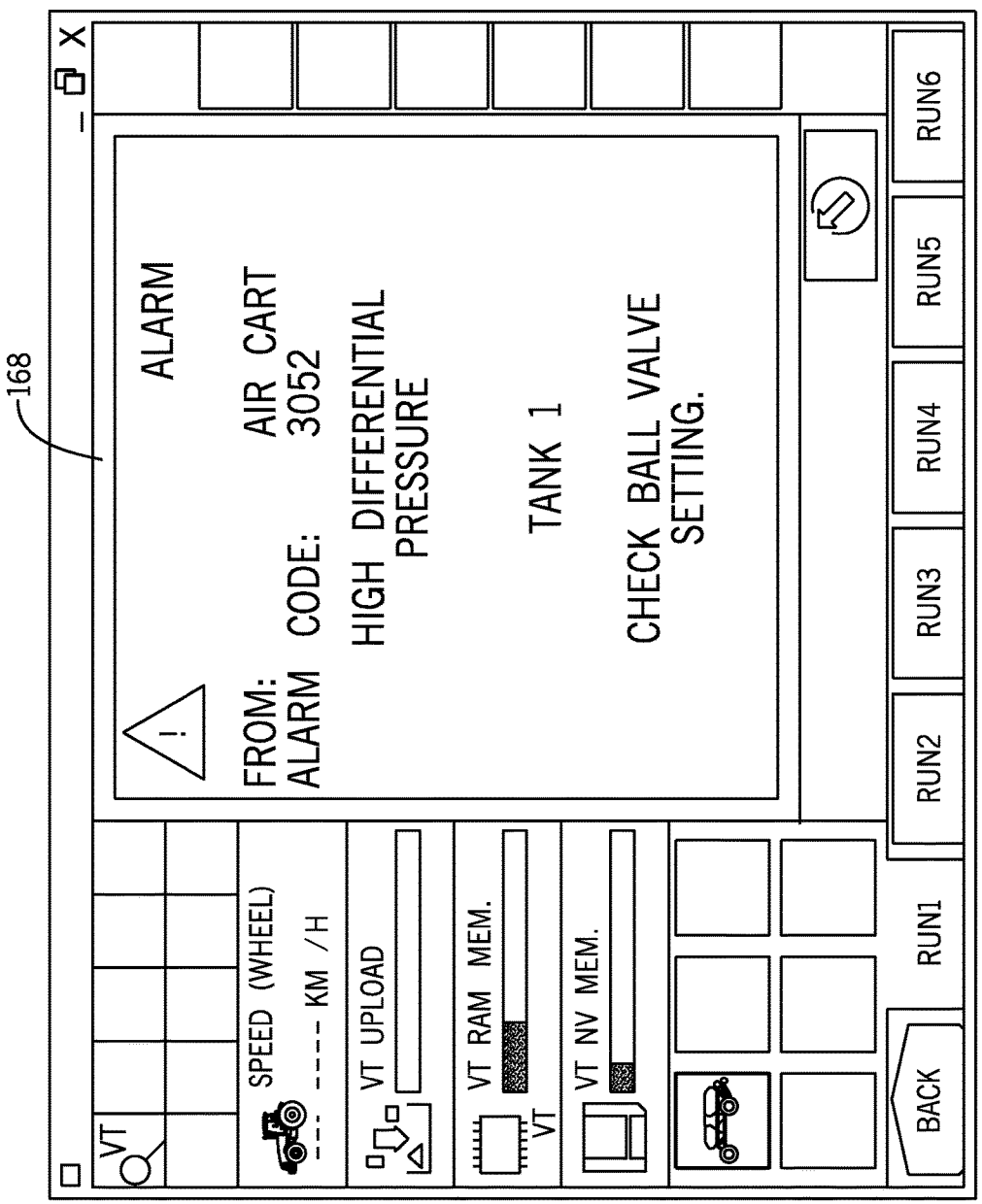
FIG. 11 is a screen showing an excessive ΔP warning, in accordance with an embodiment.

FIG. 11 is one embodiment of an excessive ΔP warning 168. As shown, the excessive ΔP warning 168 may include a warning that the ΔP (pressure differential across the metering assembly 18) is high, as well as an identification of which tank 12 is affected, and one or more possible actions for the operator to take to resolve the issue (e.g., check the ball valve setting). The warning 168 may arise if the difference between the static pressure (PS1) upstream of the metering assembly 18 and the static pressure (PS2, PS3, or PS4) downstream of the metering assembly 18 is above a desired range. The warning 168 may be displayed on the display 66 of the operator interface 64 as a pop up, or the warning 168 may be displayed after the user selects an icon (e.g., bell icon 162) on the main screen 160. In some embodiment, audible warnings may additionally or alternatively be provided (e.g., via a speaker).

Figure 12:
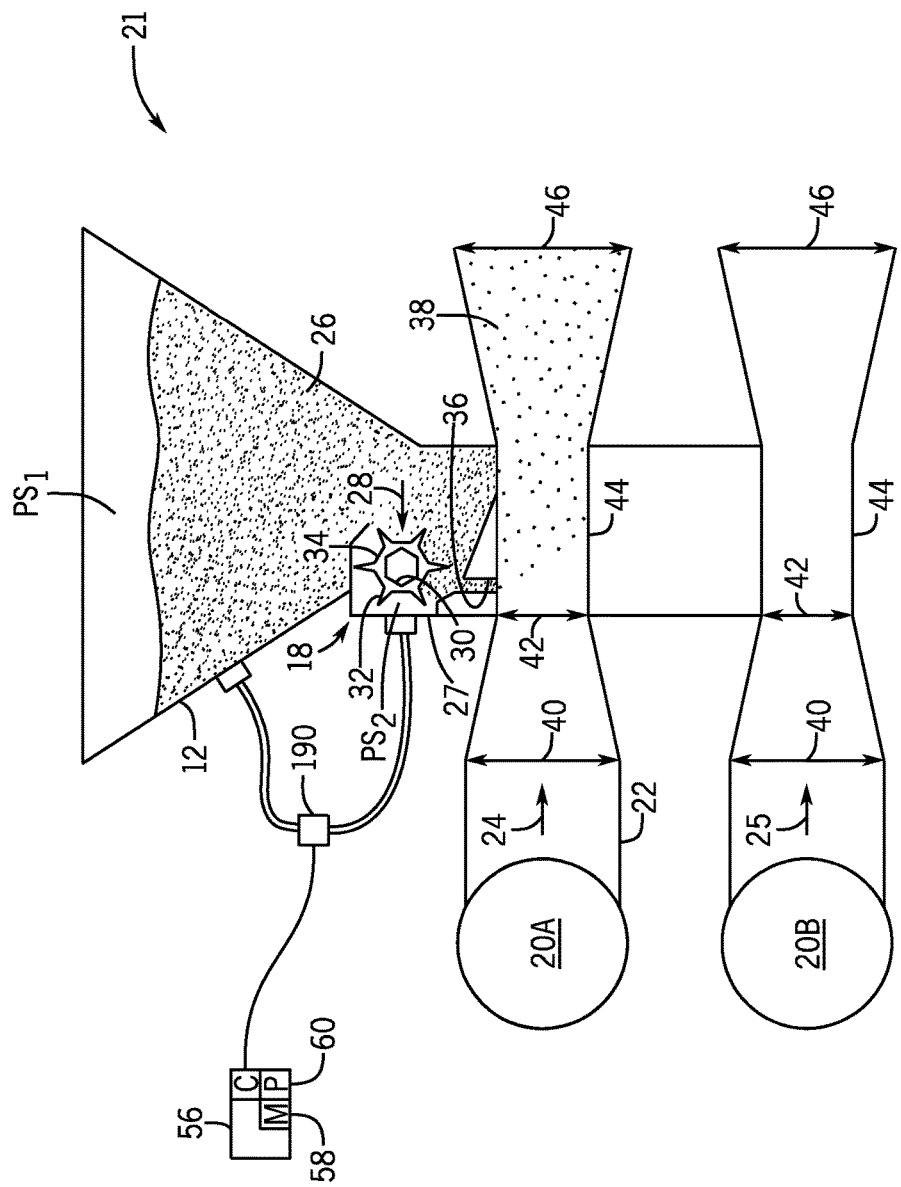
FIG. 12 is a schematic diagram of an alternate embodiment of an agricultural product distribution system, in accordance with an embodiment.

FIG. 12 shows an alternate embodiment of the pneumatic distribution system 21. In the embodiment shown in FIG. 12, rather than using a pressure sensor 48 upstream of the metering assembly 18 and a pressure sensor 49, 50 downstream of the metering assembly 18, the system 21 uses a single differential pressure sensor 190 that is fluidly coupled to the tank 12 on one side and fluidly coupled to the meter housing 27 or the primary line 22 on the other side. Rather than receiving signals indicative of static pressure from various pressure sensors 48, 49, 50, 51, the controller 56 receives a signal from the differential pressure sensor 190 that is indicative of ΔP, the pressure differential across the meter roller 28. As with previously described embodiments, the system 21 may monitor ΔP and generate warnings for an operator when the measured ΔP values fall outside of the desired range.

Figure 13:
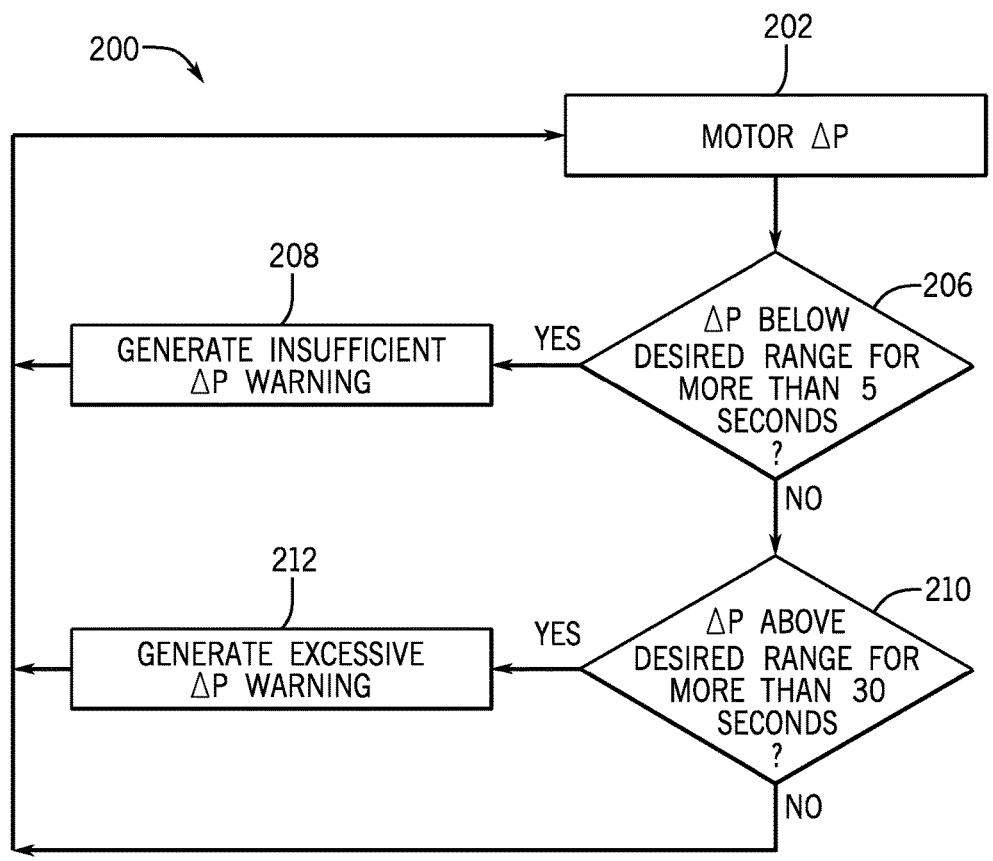
FIG. 13 is a flow chart of a process for monitoring the ΔP across a meter roller in an agricultural product distribution system, in accordance with an embodiment.

FIG. 13 is a flow chart of a process 200 for monitoring ΔP, the pressure differential across the meter roller 28, in a pneumatic distribution system 21. In block 202, the controller 56 monitors ΔP based on a reading from the pressure differential sensor 190.

At decision 206, the controller 56 determines whether ΔP is below the desired range for a period of time (e.g., about five seconds). The desired range may be set directly (e.g., the range limits input by the user) or indirectly (e.g., range limits determined by an algorithm based on factors such as desired feed rate, conditions, speed of the vehicle, type of product, etc.). For example, the bottom end of the desired range for ΔP may be any value between about 0 and 1 kPa. For example, the bottom end of the desired range for ΔP may be about 0, 0.1, 0.2, 0.3, 0.4, 0.5, 0.6, 0.7, 0.8, 0.9, or 1 kPa. If ΔP is below the desired range for the set period of time, the controller 56 generates an insufficient ΔP warning (block 208), and outputs the warning to the operator interface 64 for display to the operator. After the warning is generated, the controller 56 may return to monitoring ΔP within the system 21 (block 202). If ΔP is not below the desired ΔP range, the controller 56 proceeds to decision 210.

At decision 210, the controller determines whether ΔP is above the desired range for a period of time (e.g., about thirty seconds). The top end of the desired range for ΔP may be any value between 1.5 and 3.5 kPa. For example, the top end of the desired range for ΔP may be about 1.5, 1.6, 1.7, 1.8, 1.9, 2, 2.1, 2.2, 2.3, 2.4, 2.5, 2.5, 2.6, 2.7, 2.8, 2.9, 3, 3.1, 3.2, 3.3, 3.4, or 3.5 kPa. If ΔP is above the desired range for the set period of time, the controller 56 generates an excessive ΔP warning (block 212), and outputs the warning to the operator interface 64 for display to the operator. After the warning is generated, the controller 56 may return to monitoring ΔP within the system 21 (block 202). If ΔP is not above the desired ΔP range, the controller 56 may return to monitoring pressures within the system 21 (block 202).

As previously discussed, other embodiments may be possible based on various pressure sensor locations. For example, similar techniques may be used to monitor and control a difference between PS1 and PS3, PS1 and PS2, and the like such that a warning is generated when threshold pressures or acceptable differences between the measured pressure upstream of the meter roller 28 and the measured pressure downstream of the meter roller 28 is not maintained.

Accordingly, embodiments described herein may provide the technical benefit of improving consistency of seed distribution in an agricultural product distribution system. More specifically, a warning may be generated when measured pressures or pressure differentials fall outside of desired ranges.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A pneumatic distribution system configured to distribute a granular product to an agricultural implement, wherein the pneumatic distribution system comprises:
    a first pressure sensor configured to be fluidly coupled to a storage tank configured to store the granular product and positioned upstream of the meter roller, wherein the first pressure sensor is configured to output a first signal indicative of a first static pressure in the storage tank;
    a second pressure sensor configured to be fluidly coupled to a component of the pneumatic distribution system, downstream of the meter roller, wherein the second pressure sensor is configured to output a second signal indicative of a second static pressure downstream of the meter roller; and
    a controller communicatively coupled to the first pressure sensor and to the second pressure sensor, wherein the controller is configured to:
        determine a pressure differential, wherein the pressure differential is the difference between the first static pressure and the second static pressure;
        generate a first warning when the first static pressure is below a threshold value, wherein the first warning includes a first recommended action, and output the first warning to an operator interface;
        generate a second warning when the pressure differential is below a desired range, wherein the second warning includes a second recommended action, and output the second warning to the operator interface; and
        generate a third warning when the pressure differential is above the desired range, wherein the third warning includes a third recommended action, and output the third warning to the operator interface.

2. The pneumatic distribution system of claim 1, wherein the component is a meter housing, and the second static pressure is a static pressure in the meter housing.

3. The pneumatic distribution system of claim 1, wherein the operator interface comprises a display, and the operator interface is configured to display the first, second, and third warnings on the display.

4. The pneumatic distribution system of claim 1, wherein the meter roller is fluidly coupled between the storage tank and a primary line, and the meter roller is configured to adjust output of the granular product from the storage tank into the primary line.

5. The pneumatic distribution system of claim 1, wherein the first pressure sensor is fluidly coupled to the storage tank via an adapter fitting.

6. The pneumatic distribution system of claim 1, wherein the threshold value for the first static pressure is between about 0.1 and 1 kPa, and the desired range for the pressure differential is between about 0 and 3.5 kPa.

7. The pneumatic distribution system of claim 1, wherein the threshold value for the first static pressure is about 0.5 kPa, and the desired range for the pressure differential is between about 0 and 2.5 kPa.

8. The pneumatic distribution system of claim 1, wherein the component is a primary line, and the second static pressure is a static pressure in the primary line.

9. A pneumatic distribution system configured to distribute a granular product to an agricultural implement, wherein the pneumatic distribution system comprises:
    one or more pressure sensors configured to be fluidly coupled to a storage tank configured to store the granular product and to a component of the pneumatic distribution system downstream of a meter roller, wherein the one or more pressure sensors are configured to output one or more signals indicative of a pressure differential across the meter roller; and
    a controller communicatively coupled to the one or more pressure sensors, wherein the controller is configured to:
        generate a first warning when the pressure differential is below a desired range, wherein the first warning includes a first recommended action, and output the first warning to an operator interface; and
        generate a second warning when the pressure differential is above the desired range, wherein the second warning includes a second recommended action, and output the second warning to the operator interface, wherein the operator interface comprises a display, and the operator interface is configured to display the first and second warnings on the display.

10. The pneumatic distribution system of claim 9, wherein the desired range for the pressure differential is between about 0 and 3.5 kPa.

11. The pneumatic distribution system of claim 9, wherein the desired range for the pressure differential is between about 0 and 2.5 kPa.

* * * * *